US008693767B2

(12) United States Patent
Steglich

(10) Patent No.: US 8,693,767 B2
(45) Date of Patent: Apr. 8, 2014

(54) METHOD AND DEVICE FOR GENERATING PARTIAL VIEWS AND/OR A STEREOSCOPIC IMAGE MASTER FROM A 2D-VIEW FOR STEREOSCOPIC PLAYBACK

(75) Inventor: Michael Steglich, Steinbach (DE)

(73) Assignee: Natural View Systems GmbH, Buttenheim (DE)

( * ) Notice: Subject to any disclaimer, the term of this patent is extended or adjusted under 35 U.S.C. 154(b) by 188 days.

(21) Appl. No.: 13/496,396

(22) PCT Filed: Aug. 27, 2010

(86) PCT No.: PCT/EP2010/005335
§ 371 (c)(1),
(2), (4) Date: Mar. 15, 2012

(87) PCT Pub. No.: WO2011/032642
PCT Pub. Date: Mar. 24, 2011

(65) Prior Publication Data
US 2012/0170837 A1 Jul. 5, 2012

(30) Foreign Application Priority Data

Sep. 15, 2009 (DE) .......................... 10 2009 041 328

(51) Int. Cl.
*G06K 9/00* (2006.01)
*H04N 13/02* (2006.01)
*G03B 21/26* (2006.01)
(52) U.S. Cl.
CPC ......... *H04N 13/026* (2013.01); *H04N 13/0275* (2013.01)
USPC ............................................ 382/162; 353/34
(58) Field of Classification Search
USPC .................... 382/162; 353/6, 34, 36
See application file for complete search history.

(56) References Cited

U.S. PATENT DOCUMENTS

| 2005/0105179 | A1 | 5/2005 | Taira et al. |
| 2007/0046899 | A1 | 3/2007 | Moro et al. |
| 2007/0159476 | A1* | 7/2007 | Grasnick ....................... 345/419 |

FOREIGN PATENT DOCUMENTS

| DE | 103 48 618 A1 | 4/2005 |
| EP | 1 521 483 A1 | 4/2005 |

OTHER PUBLICATIONS

International Search Report of PCT/EP2010/005335, Dated December 16, 2010.

*Primary Examiner* — Amara Abdi
(74) *Attorney, Agent, or Firm* — Laurence A. Greenberg; Werner H. Stemer; Ralph E. Locher

(57) ABSTRACT

Image data, in particular a three-dimensional image master, is generated for stereoscopic playback via an auto-stereoscopic playback device. Image data are generated for playback that evokes a three-dimensional visual impression in a human observer by: receiving and/or importing 2D image data of an original view, deriving a plurality of further partial views that represent the information shown in the original view from different viewing angles. For each pixel of the 2D image data of the original view, color values are determined and a control value dependent on the color values is automatically assigned to each of the pixels. Each control value represents disparity information, and while deriving the plurality of partial views, which represents different viewing directions of an original scene represented by the 2D image data of the original view, the individual pixels of the original image are shifted pixel-wise relative to one another according to a displacement vector pre-set for the respective view and corresponding to the control value assigned to the individual pixel, and the pixels of the respective view are derived on the basis of the shifted pixels.

41 Claims, 6 Drawing Sheets

FIG. 6A $$\text{Assignment matrix RED}[x,y] = \begin{pmatrix} 1 & 2 & 4 & 1 & 3 & 4 & 2 & 3 \\ 1 & 3 & 4 & 2 & 3 & 1 & 2 & 4 \\ 1 & 3 & 4 & 2 & 3 & 1 & 2 & 4 \\ 2 & 3 & 1 & 2 & 4 & 1 & 3 & 4 \\ 2 & 4 & 1 & 3 & 4 & 2 & 3 & 1 \\ 2 & 4 & 1 & 3 & 4 & 2 & 3 & 1 \\ 3 & 4 & 2 & 3 & 1 & 2 & 4 & 1 \\ 3 & 1 & 2 & 4 & 1 & 3 & 4 & 2 \\ 3 & 1 & 2 & 4 & 1 & 3 & 4 & 2 \\ 4 & 1 & 3 & 4 & 2 & 3 & 1 & 2 \\ 4 & 2 & 3 & 1 & 2 & 4 & 1 & 3 \\ 4 & 2 & 3 & 1 & 2 & 4 & 1 & 3 \end{pmatrix}$$

FIG. 6B $$\text{Assignment matrix GREEN}[x,y] = \begin{pmatrix} 1 & 3 & 4 & 2 & 3 & 1 & 2 & 4 \\ 2 & 3 & 1 & 2 & 4 & 1 & 3 & 4 \\ 2 & 3 & 1 & 2 & 4 & 1 & 3 & 4 \\ 2 & 4 & 1 & 3 & 4 & 2 & 3 & 1 \\ 3 & 4 & 2 & 3 & 1 & 2 & 4 & 1 \\ 3 & 4 & 2 & 3 & 1 & 2 & 4 & 1 \\ 3 & 1 & 2 & 4 & 1 & 3 & 4 & 2 \\ 4 & 1 & 3 & 4 & 2 & 3 & 1 & 2 \\ 4 & 1 & 3 & 4 & 2 & 3 & 1 & 2 \\ 4 & 2 & 3 & 1 & 2 & 4 & 1 & 3 \\ 1 & 2 & 4 & 1 & 3 & 4 & 2 & 3 \\ 1 & 2 & 4 & 1 & 3 & 4 & 2 & 3 \end{pmatrix}$$

FIG. 6C $$\text{Assignment matrix BLUE}[x,y] = \begin{pmatrix} 2 & 3 & 1 & 2 & 4 & 1 & 3 & 4 \\ 2 & 4 & 1 & 3 & 4 & 2 & 3 & 1 \\ 2 & 4 & 1 & 3 & 4 & 2 & 3 & 1 \\ 3 & 4 & 2 & 3 & 1 & 2 & 4 & 1 \\ 3 & 1 & 2 & 4 & 1 & 3 & 4 & 2 \\ 3 & 1 & 2 & 4 & 1 & 3 & 4 & 2 \\ 4 & 1 & 3 & 4 & 2 & 3 & 1 & 2 \\ 4 & 2 & 3 & 1 & 2 & 4 & 1 & 3 \\ 4 & 2 & 3 & 1 & 2 & 4 & 1 & 3 \\ 1 & 2 & 4 & 1 & 3 & 4 & 2 & 3 \\ 1 & 3 & 4 & 2 & 3 & 1 & 2 & 4 \\ 1 & 3 & 4 & 2 & 3 & 1 & 2 & 4 \end{pmatrix}$$

METHOD AND DEVICE FOR GENERATING PARTIAL VIEWS AND/OR A STEREOSCOPIC IMAGE MASTER FROM A 2D-VIEW FOR STEREOSCOPIC PLAYBACK

CROSS-REFERENCE TO RELATED APPLICATION

This application is a §371 of copending international application PCT/EP2010/005335, which is herewith incorporated by reference in its entirety.

BACKGROUND OF THE INVENTION

Field of the Invention

The invention relates to a method and a device for generating partial views and, if appropriate, a stereoscopic image master for stereoscopic reproduction by means of an autostereoscopic reproduction device. For this purpose, from a two-dimensional imaging which is an original view and images an original scene from one viewing angle, a plurality of further views, designated as partial views, are derived which represent the original scene from other viewing angles. From these further views, in general, if appropriate including the original view, which likewise represents a partial view, a stereoscopic image master is created, which, upon reproduction by means of the autostereoscopic reproduction device, generates a three-dimensional visual impression of the original scene in a human observer.

It has long been common practice for images of the real, three-dimensional world, in the same way as computationally or artistically generated three-dimensional scenes and objects, to be imaged on two-dimensional surfaces and represented in the form of a projection. In this case, the depth information is lost, but a human already learns in early childhood to reconstruct part of this information on the basis of their experience and object knowledge.

In order to obtain the depth information, various methods for capture and for subsequent representation are known in the prior art. By way of example, the real three-dimensional world can be captured stereoscopically. For this purpose, the same scene is captured by means of at least two capturing devices from different viewing directions or viewing angles. The capture has to be effected simultaneously in the case of moving objects in the scene. The capture can be effected, for example, photographically by film or else digitally by means of a video camera, a CCD, an electronic photographic camera or the like. The different views can also be generated computationally or artistically, wherein the scenes and objects are captured from at least two directions and the resulting imagings are subsequently visualized separately to the human's left and right eyes in a suitable manner. Through recombination of the imagings in the visual perception apparatus of the human brain, a correct three-dimensional image impression can thus be generated in the observer.

Various technical solutions exist for the reproduction of the stereoscopic captured or calculated imagings. Stereo transparency image viewers for a respective observer can traditionally be mentioned here. Various methods for demarcating the right and left imaging by means of coloration and subsequent separation of the components by using differently colored spectacle lenses are furthermore known. One method which has been known for a long time utilizes the polarization property of light, wherein the different imagings are offered to the observer's eyes simultaneously, but with different directions of polarization and are separated by corresponding polarization filters (spectacles) in front of the right and left eyes. For stereoscopic representation, electronically controlled shutter spectacles are also used, in which the right and left imagings are offered to the observer alternately and with a sufficiently high speed by means of technical devices, wherein the respective right or left spectacle lens are alternately blackened at the same frequency. Given sufficient speed, the human visual apparatus is no longer able to perceive the individual images separately, and so as a result the impression of a three-dimensional overall image once again arises, even though different items of image information (views) are fed to the two eyes at different points in time. The methods which function on the basis of the various spectacles mentioned have the advantage that even a plurality of observers equipped with spectacles can simultaneously see the offered image information in an adequate manner, although the use of spectacles is subjectively often perceived as a disadvantage.

For this reason, various autostereoscopic visualization systems have been developed and nowadays are part of the prior art. In the case of these display devices or reproduction devices, a plurality of imagings from different recording positions are represented simultaneously in a superimposed manner and, in a device positioned in front of the imaging plane, are optically separated from one another such that an observer's eyes can see in each case two different imagings. This is achieved in the case of optoelectronic displays by virtue of the fact that the emission direction for individual pixels is restricted or modified and, consequently, different partial images from different directions can be seen in a restricted viewing space. If the emission angle of two adjacent images at a specific distance corresponds to the distance between the eyes, a three-dimensional image can thus be generated for the observer even without spectacles. Inter alia, barriers, lenticular films and microlens arrays are known as suitable devices for separating the emission direction.

The application US2007/0046899 by Shuji Moro et al. discloses a novel display technique in which low-loss emission of the individual images is effected using a reflection module.

Autostereoscopic representation is generally associated with a loss of pixel resolution and in many cases (e.g. when barriers are used) also with a loss of image brightness, on account of the requisite simultaneous representation of a plurality of superimposed images. Some autostereoscopic solutions additionally have the disadvantage that only one individual observer in each case can perceive the stereoscopic effect, use also being made of complicated tracking systems with the aid of which the observer's own movement or eye movement in the space in front of the imaging plane are identified and subsequently compensated for.

The above-mentioned methods for generating three-dimensional image impressions in humans presuppose that in each case at least two different views of the represented scene or of the objects are present, which have been captured or calculated from different directions. Multi-camera systems and corresponding image memory and transmission means are required for capturing this type of image material. For virtually generated scenes, this task can generally be achieved relatively simply by rendering two views of the scenes with different virtual camera positions.

However, there already exist enormous amounts of monocularly recorded image and film materials in a wide variety of digital and analog formats which are part of the stock of human culture. Almost the whole of studio and recording technology for image information as well as transmission channels and visualization technology are currently designed for monocularly recorded image information. Doubling the bandwidths, as would be necessary for transition to stereoscopic image information, is in part technically not possible and scarcely feasible economically.

As mentioned, providing different views for virtually generated scenes by multiple rendering generally does not pose a problem: since the required resolution for the stereo pairs is lower, a significantly higher computational complexity does not arise in this case either. However, this holds true only for reproduction on a specific reproduction device and a predetermined optimum viewing distance of an autostereoscopic display. The problem with regard to the increased bandwidth required during transmission remains, however, if reproduction is intended to be effected on arbitrary autostereoscopic reproduction devices, since the partial images then have to be transmitted with full resolution.

The situation is different in the case of recordings of the real world (film, television) or with regard to the existing stock of, in particular, film and video material including traditionally generated animation films. For already old virtually generated material (computer games, presentations, etc.), as well, a recalculation in stereoscopic form is not unproblematic.

Besides the abovementioned difficulties and problems in recording and transmission technology, further obstacles obstruct the widespread use of stereoscopic methods. This is because it is no longer possible to imagine modern film and video production without optically and computationally generated effects such as cross-fades, insertions, special effects techniques and the mixing of reality and virtual reality. These effects are based to a not inconsiderable degree on the mixing of 2D and 3D image material. Most of the methods and tools could no longer be used, or could be used only in a highly restricted fashion, in the case of stereoscopic reproduction.

Furthermore, it has been found in the experimental use of stereoscopy that the viewing of stereoscopically captured and autostereoscopically reproduced image information can trigger problems with regard to visual perception in the observer. These problems are caused by the fact that, in the case of stereoscopic recordings, the recorder, by means of the focusing of the recording optical system used, decides about which image plane is viewed or is intended to be viewed, but the observer is accustomed on the basis of their experience to focus their eyes on individual objects or at a viewing distance independently and at their own discretion. On account of this dilemma, the resulting visual impression of the observer does not correspond to natural perception, despite the stereoscopically correct representation. Occurrence of physiological, psychological and/or medical problems, for example in the accommodation of the eyes, is also known in the event of relatively long viewing of such image sequences.

On account of the technical, economic and further problems mentioned, for some time efforts have been made to condition traditionally monocularly recorded image information computationally in such a way that it can be visualized with generically generated additional depth information by means of stereoscopic display technology. Since the real depth information is absent, these approaches are based, in particular, on upstream operations for image analysis and image segmentation, which can be performed either interactively by an operator or by means of combined imaging processing methods.

DE 103 48 618 A1 describes a method in which, by means of upstream interpretation and segmentation of a present imaging by analysis of the structure resolution or of the color components present predominantly in specific regions, segmentation into individual, contiguous regions is effected, to which regions more or less arbitrarily different depth values are then assigned manually or interactively by means of an operator. In this case, the segmentation is based on empirical rules. In exceptional cases, contents can be derived from the segmentations in an automated manner and depth values can be assigned to the contents. However, this necessitates content-related predeterminations.

In the method described, the segments determined are assigned to individual depth planes; a depth map continuous throughout for the output image cannot be generated. Furthermore, emphasizing individual image segments in the foreground or moving them back to the background is linked expressly to the interpretation of the image content, i.e. to the identified objects present in the respective scene. Thus, DE 103 48 618 A1 expressly emphasizes the content-dependent segmentation procedure. An automated identification of these image contents is possible, if at all, only in special cases.

An automated generation of a plurality of views of a two-dimensionally captured original scene and/or of a stereoscopic image master derived therefrom is not possible using the methods according to the prior art.

BRIEF SUMMARY OF THE INVENTION

It is an object of the invention, therefore, to provide a method and a device which generate, in an automated manner from a two-dimensional (2D) view of an original scene, further views of the original scene which represent the scene from different viewing angles or viewing directions and assemble therefrom as required a stereoscopic image master that, upon reproduction by means of a stereoscopic or autostereoscopic reproduction device, a three-dimensional visual impression that is as realistic as possible is evoked in an observer. The method and the device are preferably designed to be able to process individual two-dimensional views of a sequence in an automated manner in real time, i.e. without requiring human intervention during the processing.

The invention is based on the insight that the receptors for different color stimuli on the human retina are not distributed uniformly. Therefore, different hues influence human spatial vision to different extents. What is proposed is a method for generating image data for reproduction which evokes a three-dimensional visual impression in a human observer, comprising the following steps: receiving and/or reading in 2D image data of an original view, deriving a plurality of further views which represent items of information shown in the original view, which are designated as the original scene, from different viewing angles. These views which represent the original scene from different viewing directions or viewing angles are also designated here as partial views hereinafter. According to the invention, it is provided that for each pixel of the 2D image data of the original view, color values of at least two primary colors of a color system are determined, a control value is assigned to each of the pixels in an automated manner depending on the at least two color values determined, wherein each of the control values represents disparity information, and when deriving the plurality of views which represent different viewing directions of an original scene represented by the 2D image data of the original view, the individual pixels of the original view are displaced relative to one another pixel by pixel in accordance with a displacement vector predetermined for the respective partial view and in accordance with the control value assigned to the individual pixel, and the pixels of the respective partial view are derived on the basis of the displaced pixels of the original view. What is crucial is that the control values which the disparity of individual pixels in the different views together with displacement vectors which define a change in viewing angle between the individual views are derived in an automated manner only depending on the individual color values assigned to the individual pixels of the original view. The plurality of partial views of the original scene represented in the original view can thus be determined in a fully automated manner without human intervention. The disparity or disparity information is understood here to be a measure indicating the magnitude of an offset of the imaging positions of the same imaged object in different partial views which represent the same original scene from different viewing directions. Consequently, a device for generating image data for reproduction by means of a stereoscopic or autostereoscopic reproduction device is provided, the reproduction of which by means of the reproduction device evoke a three-dimensional visual impression in a human observer, wherein the device comprises: an interface for receiving digital 2D image data of an original view, and a view determining unit for deriving a plurality of derived partial views which represent the original scene represented in the original view in each case from a different viewing angle. According to the invention, the view determining unit comprises a color value determining unit, which determines color values for at least two primary colors of a color system for each of the pixels of the original view, an assignment unit, which assigns a control value to each of the pixels, depending on the at least two color values determined, and a displacement unit, which, for each of the further views, displaces each of the individual pixels of the original view depending on the assigned control value and a displacement vector predetermined for the corresponding view and derives the pixels of the respective partial view on the basis of the displaced pixels. This means that the visibility and, if appropriate, the location of the visibility and the color value in the respective partial view including the adjacent pixels are defined on the basis of the assigned control value and the displacement vector for each pixel. An advantage of the invention is that a plurality of derived partial views can be created in a simple manner, without this requiring intervention by a person or necessitating a content of the original scene represented in the original view. Depending on the choice of viewing directions or viewing angles or viewing positions for which the individual partial views are derived, the original view also represents a partial view, to which the displacement vector 0 is assigned. This is the case when the original viewing direction (or the original viewing angle or the original viewing position) is assigned to one of the partial views. Even if one of the partial views is identical to the original view, this partial view is also interpreted as a derived partial view. This means that the derived partial views can encompass the original view, but need not always encompass it. In many cases, all the partial views which are derived differ from the original view.

The image data obtained are generally represented by means of autostereoscopic reproduction devices. The latter are generally supplied with a so-called stereoscopic image master. Such a master can be created by means of bringing together the plurality of derived partial views which, if appropriate, encompass the original view. One preferred development therefore provides for combining the derived partial views to form a stereoscopic image master. A corresponding device therefore comprises a combination unit for creating the stereoscopic image master. The manner in which the plurality of derived partial views which, if appropriate, encompass the original view are combined to form a stereoscopic image master is dependent on the reproduction device which is intended to be used. The requisite indications are generally specified by the manufacturer of the reproduction device.

In one embodiment, the control values for the 2D image data of the original view are determined at a central location, for example a transmitting station, and are assigned to said data. In the transmitting station, therefore, a method is performed which comprises the following steps: receiving and/or reading in 2D image data of an original view, deriving and assigning a control value to each pixel of the original view; wherein for each pixel of the 2D image data of the original view color values of at least two primary colors of a color system are determined, a control value is assigned to each of the pixels in an automated manner depending on the at least two color values determined, wherein each of the control values represents disparity information.

Afterward, the 2D image data together with the control values are transmitted to one or a plurality of receiving stations, which is indicated by means of an arrow. It goes without saying that the transmission can be effected in a coded or uncoded manner depending on the transmission path. In the case of a coding, it is also possible to choose a coding which makes it possible to detect and, if appropriate, even correct transmission errors.

In the receiving stations, the following steps are performed: receiving and/or reading in 2D image data of an original view and control values assigned to pixels of the 2D image data, wherein each of the control values represents disparity information and, for the assigned pixel of the 2D image data of the original view, is determined from color values of at least two primary colors of a color system or can be determined from them in an automated manner, deriving a plurality of further partial views which represent the information shown in the original view from different viewing angles;

wherein when deriving the plurality of partial views which represent different viewing directions of an original scene represented by the 2D image data of the original view, the individual pixels of the original view are displaced relative to one another pixel by pixel in accordance with a displacement vector predetermined for the respective view and in accordance with the control value assigned to the individual pixel, and the pixels of the respective partial view are derived on the basis of the displaced pixels.

A device for image data processing for generating image data for reproduction by means of a reproduction device, upon the reproduction of which image data by means of the reproduction device a three-dimensional visual impression is evoked in a human observer, comprises in such a receiving station: an interface for receiving digital 2D image data of an original view and control values, wherein each pixel is assigned exactly one control value and each of the control values represents disparity information and, for the assigned pixel of the 2D image data of the original view, is determined from color values of at least two primary colors of a color system of said assigned pixel or can be determined from said color values in an automated manner; a view determining unit for deriving a plurality of partial views which represent the original scene represented in the original view from different viewing angles; and a combination unit for creating a stereoscopic image master from the plurality of partial views, wherein the view determining unit comprises a displacement unit, which, for each of the partial views, displaces each of the individual pixels of the original view depending on the assigned control value and a displacement vector predetermined for the corresponding partial view and derives the pixels of the respective partial view on the basis of the displaced pixels.

A transmitting station comprises a device for image data processing for conditioning image data for reproduction by means of a reproduction device, upon the reproduction of which image data by means of the reproduction device a three-dimensional visual impression is evoked in a human observer, wherein the device comprises: an interface for receiving digital 2D image data of an original view;

a color value determining unit, which determines color values for at least two primary colors of a color system for each of the pixels of the original view, and an assignment unit, which assigns a control value to each of the pixels, depending on the at least two color values determined. Preferably, the 2D image data and the assigned control values can be output or provided via the interface for receiving the 2D image data or a further interface, for example a transmitting interface.

In one preferred embodiment, the control values assigned to the individual pixels are calculated. In one development of a device according to the invention, a calculation unit is provided for this purpose. In this case, a function dependent on the at least two color values determined as variables is used.

In one preferred embodiment, the function for calculating the control values in a manner dependent on the color values determined is a function which has an extreme value and is continuous or discretely continuous, but need not be continuously differentiable.

In addition to the dependence on the at least two color values determined, the function can also be dependent on parameter values which are determined by the reproduction device by which the image data generated are intended to be reproduced. Furthermore, in some embodiments, a predetermined optimum viewing distance influences the calculation of the control values.

Color system denotes a system which makes it possible to characterize a color by means of color values of individual primary colors. One known color system for characterizing colors is, for example, the RGB system, (red-green-blue system) in which the individual colors can be generated by means of color addition of a red color component, a green color component and a blue color component of the primary colors red, green and blue. When determining color values for a color, that proportion of the individual primary color with which the latter participates in the color addition is respectively determined. In this case, in the RGB color system, by way of example, color values of between 0 and 100 are determined for each primary color. The color values then indicate a percentage of an intensity with which the respective primary color is included in the color addition. If, in an RGB color system, by way of example, all the colors red, green and blue are included in the color addition with 100% intensity, then this results in a white color for the human observer. If red and green are included with 100% intensity and blue with 0% intensity in the color addition, then this results in a yellow hue, for example.

Particularly if a plurality of original views of an image sequence are intended to be processed for three-dimensional conditioning, which views are intended subsequently to be output on the same reproduction device and viewed at the same distance therefrom, it is advantageous if the control values, which then, after all, are exclusively dependent on the at least two color values, are calculated only once for all possible color value combinations and are stored in a control value memory. When the control values are assigned to the individual pixels, the control values can then be read out from the control value memory depending on the at least two color values determined.

In another embodiment, the control values are calculated in each case individually in an up-to-date manner for each pixel on the basis of the control value function. This is appropriate when image data for only one original view are intended to be processed or image data from different original views are intended to be processed successively, which, however, are intended to be viewed on different reproduction devices or at different distances from the reproduction device or devices.

In order to be able to use reproduction devices which generate a spatial effect not only from one viewing position, it is necessary for more than two views to be derived from the original view. In one preferred embodiment, n partial views are derived, where n≥2 holds true and the displacement vector (assigned to the partial view) $V_m$ of the partial view m where m=1, ... n is given by: $V_m = a*(-1+2*(m-1)/(n-1))$, where a is a constant and the following preferably holds true: a=1. In this embodiment, the number of partial views generated which represent a viewing position displaced toward the left relative to an original viewing position, from which the original view is recorded, is identical to the number of views generated which represent a viewing position displaced toward the right relative to the viewing position chosen for the original view. If n is odd, then the original view represents one of the partial views, namely the partial view m=(n+1)/2, which is preferably concomitantly used for calculating a stereoscopic image master. It is advantageous for the viewing positions to be displaced in each case by the same distance with respect to one another. In the preferred embodiment described, this is ensured by means of the choice of the displacement vectors.

The displacement of the individual pixels of the original view is preferably effected in such a way that the respective pixels are displaced in accordance with a disparity vector, wherein the disparity vector is calculated for each pixel as a product of the control value assigned to the pixel and the displacement vector of the corresponding view. The disparity vector is therefore, for each pixel, the displacement vector of the corresponding view weighted with the corresponding control value. The pixels of the original view are successively processed line by line individually in the direction in which the respective displacement vector points which is assigned to the partial view which is derived. The pixels of the original view which are displaced to positions which remain (relative to the processing direction) behind a position to which a pixel of the line has already been displaced beforehand are not taken into consideration. This is caused by the fact that pixels which have a lower control value than their adjacent pixel which is arranged "before them" with regard to the displacement direction are not visible in the generated derived partial view representing a changed viewing angle relative to the original view. The disparity expressed by the control value therefore also determines, in relation to the disparities (control values) of the adjacent pixels (not necessarily the directly adjacent pixels), a visibility of the corresponding pixel. Pixels which will not be visible in one of the partial views accordingly need not be displaced for said partial view. This is tantamount to the corresponding pixel of the original view not being taken into consideration. The pixels of the derived view, of the partial view, are subsequently derived from the displaced pixels.

If the control values are integral and if the magnitude of the displacement vector V is also an integral value, then the pixels which are assigned to a matrix having vertical columns and horizontal lines, during the displacement process, are automatically displaced to a new matrix position if it is assumed that the distance between the individual matrix positions is an integral multiple of the pixel distance and the control value range and the range of values of the lengths of the displacement vectors are chosen accordingly. Since a resulting offset of the individual pixels of the original view is determined exclusively by the pixel-related control values and the partial-view-related displacement vectors, gaps can arise in the pixel structure or matrix assigned to the displaced pixels if disparity vectors of the pixels that are adjacent in the original view differ from one another. These are to be assigned in part to pixels of the original view that are not displaced or are not to be taken into consideration, as already explained above. However, gaps also arise when the control value of the pixels becomes larger in the processing direction. A succeeding pixel is thus displaced by a larger magnitude than the preceding pixel, such that one or more gaps can arise between them. The gaps, independently of their originating cause, can either be filled by the color values of the displaced pixel which, with regard to the displacement direction, is arranged before the respective gap or gaps of the pixel structure or matrix, i.e. is displaced to a smaller extent, or not at all than the pixel which is displaced to an extent such that one or a plurality of other pixels with a lower control value is or are to be regarded as not visible and is or are therefore left out of consideration or undisplaced and thus causes or cause the one or the plurality of gaps.

Another embodiment provides for the gaps produced in a line to be provided with color values determined by an interpolation from the color values when deriving the view displaced pixels to be taken into consideration which enclose or delimit the gaps after the displacement. If the magnitudes of the disparity vectors formed from the displacement vectors and the control values are not integral, then it is necessary, for all or most of the pixels of the matrix assigned to the partial view, either to define the color values for the individual matrix positions on the basis of the color values of the pixel which is closest to the matrix position in the respective line, or to calculate the color values by means of an interpolation from the color values of the displaced pixels to be taken into consideration. The interpolation can be performed linearly or performed in a manner following some other predetermined function. Furthermore, it is also possible to take into consideration color values of displaced pixels which are next but one or next but two, etc. neighbors. It is noted that the pixels of the partial views are, of course, respectively allocated complete color information comprising color values with regard to all the primary colors of the color system.

In any case, however, the computational complexity for generating the individual partial views to be derived of an original view of a sequence can be kept so low that the plurality of partial views can be calculated in "video/TV real time", i.e. after a start-up phase required, if appropriate, it is possible to calculate the plurality of partial views with the timing of the image rate of the image sequence. In this case, it should be taken into consideration that it is possible both for the individual partial views to be derived in parallel and for the individual lines to be processed line by line in each case in parallel independently of one another. This parallelization makes it possible, even at high original view rates which are to be processed, to calculate the required derived partial views for determining a stereoscopic image master with the clock rate of the image sequence during reproduction of an image sequence.

Since, in general, the received 2D image data are accessed multiply when deriving the partial views and the control values, they are stored in a first memory area in some embodiments. It is likewise provided in some embodiments to store the partial views determined, or at least parts thereof, in second memory areas.

The individual units of the device for generating the required image data are preferably realized by means of a software-controlled computer unit. However, it is likewise also possible to integrate the individual units into one or a plurality of FPGA units. Yet another embodiment provides for an ASIC circuit to implement the individual units, wherein the image data of the original unit and, if appropriate, parameter values which are device-dependent or dependent on viewing distance can be read in via data lines and the generated image data are output via data lines. In this case, embodiments can be realized in which the first memory area and the second memory areas can be integrated into the ASIC circuit or else can be situated in a memory coupled to the ASIC circuit. The situation is the same with the control value memory, which, however, is preferably realized in the ASIC circuit.

The invention is explained in greater detail below on the basis of a preferred exemplary embodiment with reference to a drawing, in which:

BRIEF DESCRIPTION OF THE SEVERAL VIEWS OF THE DRAWING

FIGS. 6a to 6c show exemplary assignment matrices for the combination of partial views to form a stereoscopic image master.

DESCRIPTION OF THE INVENTION

Figure 1:
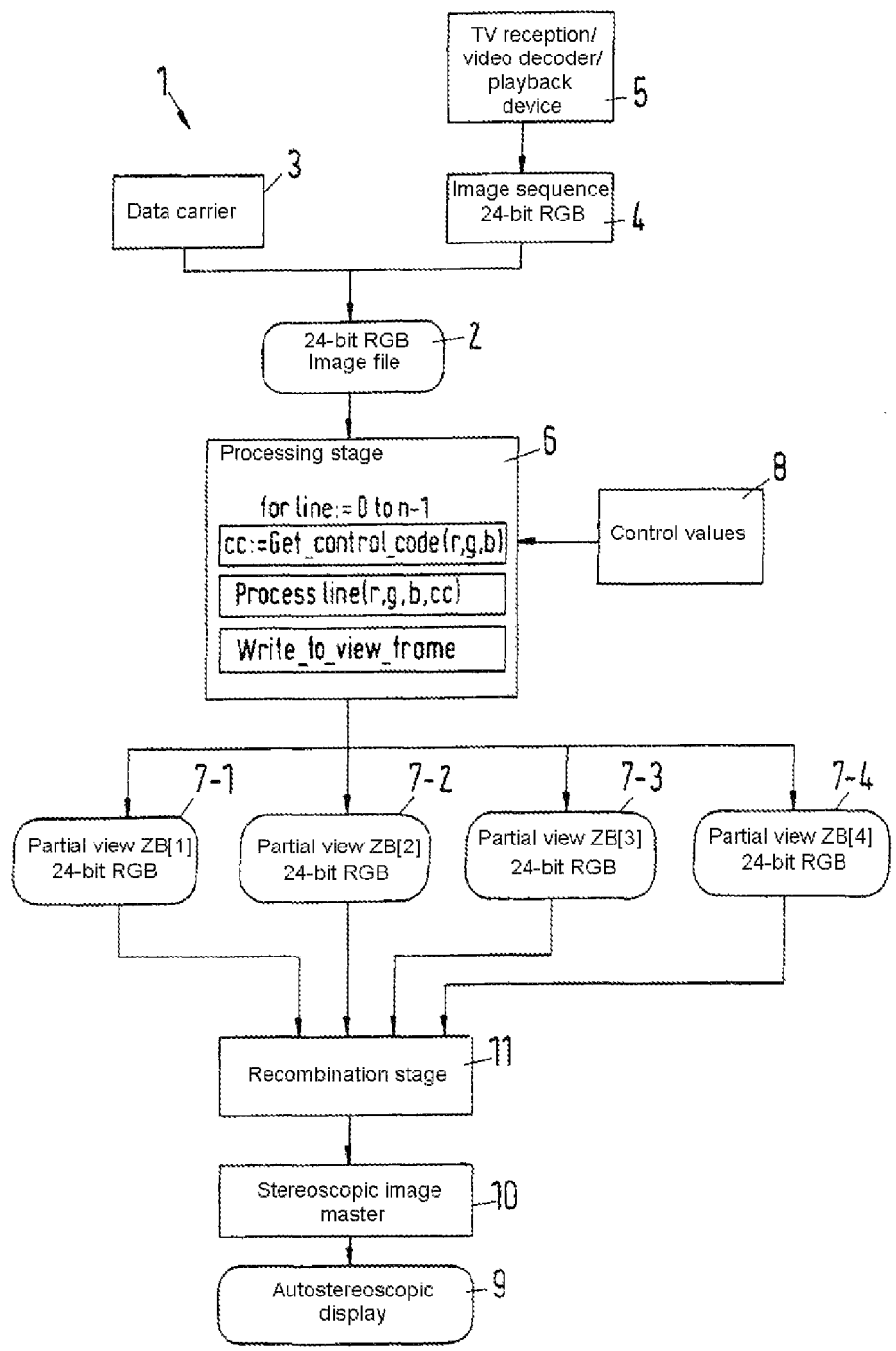
FIG. 1 shows a schematic sequence of the processing of image data of a 2D image for conditioning and representation as a 3D image.

FIG. 1 schematically illustrates a method 1 for processing 2D image data of an original view 2. Firstly, the 2D image data are received, captured or read in for example in the form of an image file. In this case, the image file of the 2D image data comprises digitized pixels of the original view 2, which represents an original scene. The received 2D image data are preferably color 2D image data. In this case, an item of color information is available for each pixel of the original view 2. By way of example, a total of 24 bits are available for coding the color, wherein 8 bits in each case are used for a coding of a color value in an RGB color system. However, the received 2D image data can have a gray-scale coding, wherein each pixel is assigned a gray shade.

The received 2D image data can be the image data of an individual image which originates from a data carrier 3, for example, or a view of an image sequence 4, which is provided by a receiving/reproduction device 5, for example. The receiving/reproduction device 5 can be, for example, a television receiver, a video recorder, a DVD player or some other playback device.

The 2D image data are processed in a processing stage, which can also be designated as a view determining unit 6, in order to derive a plurality of partial views 7-1, 7-2, 7-3, 7-4 therefrom. The plurality of derived partial views 7-1 to 7-4 each have the same number of pixels as the original view represented by the 2D image data. If a change in the format, the resolution etc. is desired in the 3D reproduction sought by comparison with the original view 2, then the original view is correspondingly adapted prior to processing, such that this condition holds true for this adapted original view and the partial views derived therefrom.

Each of the derived partial views 7-1 to 7-4 represents the original scene represented by the original view 2 from a different viewing position or a different viewing angle or a different viewing direction. The view determining unit 6 firstly determines at least two color values of primary colors of a color system for each pixel of the original view 2. In the exemplary embodiment illustrated here, in which the 2D image data of the original view are made available in the form of an RGB-coded image file, the corresponding color values, for example for the primary colors red and blue of each pixel, can simply be read from the 2D image file. If the 2D image file is provided in a manner coded in a different color system or in gray-scale values, then the color values possibly have to be calculated. Conversion of the color values into the RGB color system preferably takes place. There are known calculation specifications in the prior art for conversion from a gray-scale coding into an RGB coding or conversion from one color system into another color system.

On the basis of the color values determined, control values 8 are individually assigned to the pixels of the original view 2. The control value 8 in each case represents disparity information, which in the later processing sequence determines how great the disparity will be for the respective pixel in the individual derived partial views 7-1 to 7-4 with respect to the original view 2 or between the individual derived partial views 7-1 to 7-4. If a real scene is recorded from two viewing positions that are displaced slightly relative to one another, then it is established that pixels which represent the same object and have a great disparity between the two recordings often "hide" pixels of objects which would have only a smaller disparity. Consequently, the control values 8 also regulate the visibility of individual pixels of the original view 2 in the derived partial views 7-1 to 7-4, as will be explained further below.

The individual pixels of the 2D image file can be assigned to a pixel matrix having vertical columns and horizontal lines. In order to generate the individual derived partial views 7-1 to 7-4, the 2D image data of the original view 2 are multiply processed line by line in order to respectively generate pixel lines for the plurality of derived views 7-1 to 7-4. In this case, each line is respectively processed as often as derived partial views are generated. (If one of the derived partial views is identical to the original view on account of the predeterminations with regard to the viewing directions allocated to the partial views, then processing of the image line can, of course, be obviated.) In the exemplary embodiment illustrated, in which four derived partial views 7-1 to 7-4 are generated or derived, therefore, each line of the original view 2 is processed four times. In this case, the image line of the original view 2 is respectively taken as a basis. Each of the partial views 7-1 to 7-4 to be derived is assigned a displacement vector $V_m$, where m indicates an index of the respective view, i.e. m=1, ..., n, and n indicates the number of derived views. The derived partial views 7-1 to 7-4 in each case represent the original scene represented by the original view 2 as viewed from different viewing positions. Said viewing positions are or have been calculated in each case at an identical distance equidistantly symmetrically on the right and left with respect to the viewing position from which the original view is recorded. The displacement of the viewing position relative to the viewing position of the original view is represented in each case by means of a displacement vector $V_m$ assigned to the respective partial view m. Given an identically spaced-apart symmetrical distribution of the viewing positions for the partial views to be derived, this results in a calculation specification for the displacement vector $V_m = a*(-1+2*(m-1)/(n-1))$ where a is a constant and is preferably chosen to be equal to 1. The displacement vector $V_m$ assigned to the respective partial view m is weighted or scaled with the control value assigned to the individual pixel, in order to determine a disparity vector for each individual pixel of the original view 2 during the line-by-line processing. For each pixel of the original view 2, therefore, the number of disparity vectors determined is the same as the number of partial views derived. While the control values in each case have the same sign, both positive and negative displacement vectors occur. In this case, the sign of the displacement vector is associated with a displacement direction. Within a pixel line, a positive sign is associated with a direction which points from the left toward the right, and a negative sign is correspondingly associated with a direction which points from the right toward the left. The individual pixels of a line are processed in accordance with that direction which is predetermined by the direction of the displacement vector for the corresponding partial view. If the displacement vector is positive, then the pixels of a line are processed from the left toward the right and displaced from the left toward the right in accordance with the respective disparity vector. In this case, it should be taken into consideration that those pixels whose disparity vector has a length that is less than the length of the previously processed pixel, on account of the disparity in the corresponding partial view which is calculated are not visible and are therefore not displaced or are not taken into account for the derivation of the pixels of the corresponding partial view. This also means that pixels whose disparity vector would allocate to them a new position already occupied by a previously displaced pixel having a larger disparity vector are not visible and are therefore not displaced or taken into account. Since this can occur not only with regard to the pixel processed directly beforehand, it generally holds true that a pixel which would be displaced by the disparity vector to a position remaining behind a position with respect to the processing direction to which a pixel of the line has already been displaced beforehand is not displaced or is not taken into account when deriving the pixels for the corresponding partial view.

In one embodiment, the magnitudes of the disparity vectors are rounded to integers, such that the displaced pixels can be associated with pixels of a matrix-like grid of the partial view to be derived. The displaced pixels thus directly represent the derived pixels of the partial view.

Since the disparity vectors of originally (not necessarily directly) adjacent pixels of the original view can deviate directly from one another, as is explained above, vacancies or gaps in the matrix-like grid associated with the corresponding partial view occur between the displaced pixels which are taken into account when deriving the pixels of the partial view. In one embodiment, said gaps are filled with the color values which correspond to the pixel that was previously displaced with respect to the processing direction of the line and is to be taken into account. In another embodiment, the color values of the gaps are calculated by an interpolation of the adjacent color values to be taken into account.

Instead of a rounding of the lengths of the disparity vectors to integers, the color values for the individual pixels can also be calculated from the displaced pixels to be taken into account, the positions of which then do not exactly correspond to the pixel positions of the matrix-like grid of the partial view, by means of interpolation with subpixel accuracy. The pixels of a line can in each case be determined independently of the pixels in the adjacent lines. Likewise, the pixels of the different derived partial views 7-1 to 7-4 to be generated can be derived at the same time independently of one another from the pixels of the image data which the original view 2 represents. As a result, it is thus possible for the calculation of the individual derived partial views 7-1 to 7-4 also to be parallelized temporally. It is thus possible, even in the case of high-resolution image formats having a high image frequency, to calculate the plurality of derived partial views 7-1 to 7-4 in real time, i.e. at the image frequency.

In the embodiment described here, the individual determined liens of pixels of the derived partial views 7-1 to 7-4 are in each case stored in corresponding image memories. In order to ensure reproduction by means of a stereoscopic reproduction device 9, the plurality of derived views 7-1 to 7-4 are combined to form a stereoscopic image master 10 in a so-called recombination stage 11, said master being output to the stereoscopic reproduction device 9.

It is once again noted that the original view is rescaled to the reproduction format prior to processing, i.e. derivation of the plurality of views, if the resolution of the reproduction device deviates from a resolution of the original view. This is not illustrated in FIG. 1, but can optionally be provided.

In one preferred embodiment, the control values 8 are calculated in accordance with a function that is dependent on the blue and red color value components of the pixels. The function has an extremum that occurs in the case of a red value $R^{lim}$ and in the case of a blue value $B^{lim}$. The red and blue color values $R^{lim}$, $B^{lim}$ at which the maximum of the control value function occurs are designated as red color limit value and blue color limit value. Firstly, the absolute values of the differences between the respective color value and the corresponding color limit value are determined. The control value is defined by the respective larger one of these absolute values divided by a normalization constant. If the absolute value of the color value—reduced by the magnitude of the red color limit value—of the red color component of a pixel of the original view 2 is greater than the absolute value of the color value—reduced by the magnitude of the blue color limit value—of the blue color component, then the control value is determined by the absolute value of the difference between the red color value and the red color limit value; by contrast, if the absolute value of the color value—reduced by the magnitude of the blue color limit value—of the blue color component is greater than the absolute value of the color value—reduced by the magnitude of the red color limit value—of the red color component, then the control value is determined by the absolute value of the difference between the blue color value and the blue color limit value. The absolute values of the corresponding differences are respectively normalized by a common factor.

In a generalized form the following holds true:

That $f_1$ and $f_2$ be color values of a pixel with respect to two primary colors; the control value $S(f_1,f_2)$ is then calculated in accordance with the following formula:

$$S(f_1,f_2) = (|f_1 - f_1^{lim}|/\text{const.}), \text{ if } |f_1 - f_1^{lim}| >= |f_2 - f_2^{lim}|$$

and $$S(f_1,f_2) = (|f_2 - f_2^{lim}|/\text{const.})$$

where const. denotes a normalization constant and $f_1^{lim}$ and $f_2^{lim}$ are color limit values of the primary colors at which the control value function $S(f_1,f_2)$ has an extremum. The function is continuous over the area of the color values $f_1$ and $f_2$. Given a suitable choice of the color system, the control values are dependent on exactly two color values.

Since the control values for a plurality of image data sets representing different original views of an image sequence remain unchanged, the control values can be stored in a control value memory and can be read out from the latter and only have to be calculated a single time for the corresponding image sequence. If the reproduction device used and the desired optimum viewing distance remain constant for different image sequences, then the control values only have to be calculated a single time.

Figure 2:
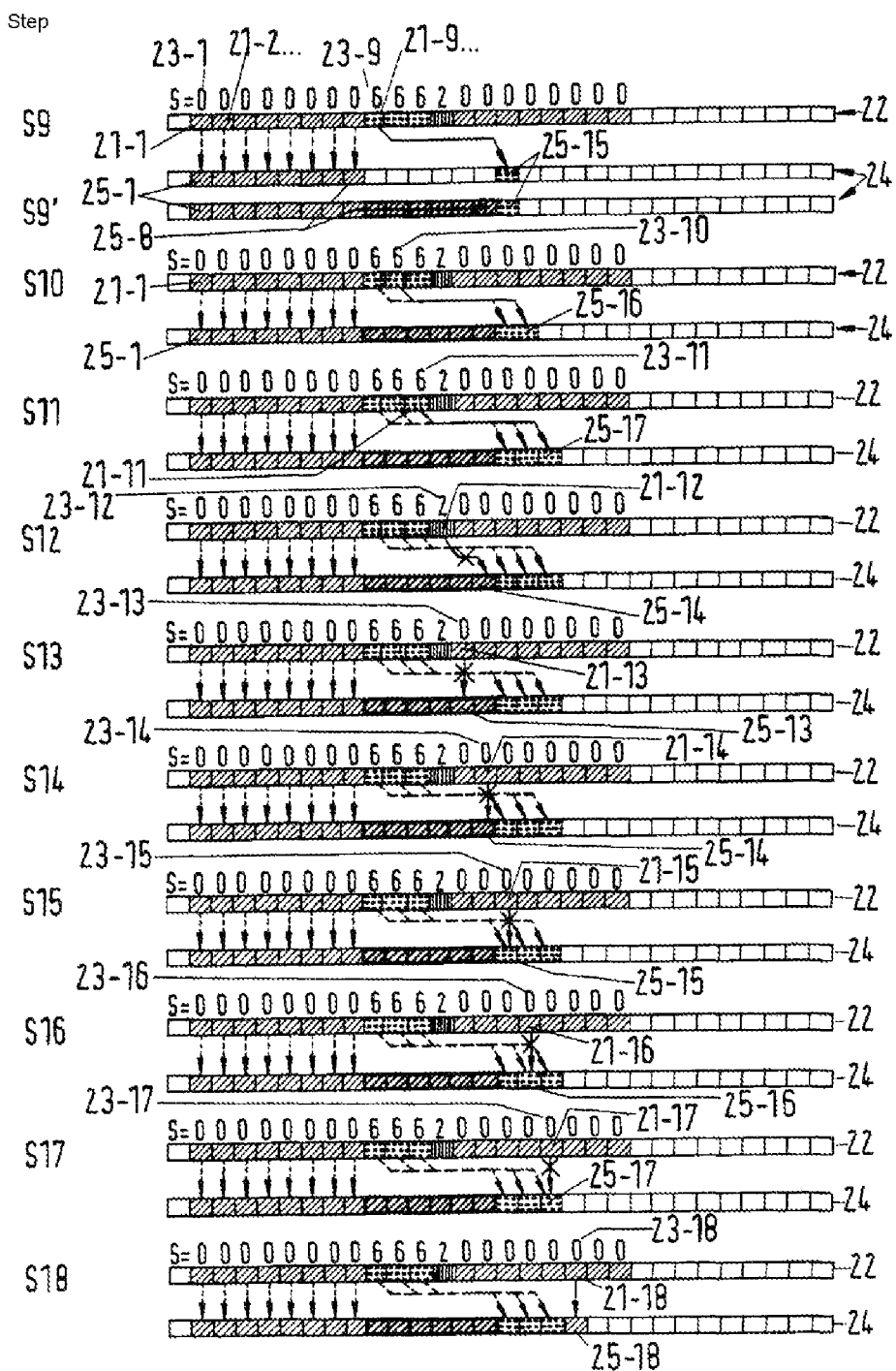
FIG. 2 shows a schematic illustration for elucidating the pixel-by-pixel displacement of pixels for generating the derived partial views.

With reference to FIG. 2 the intention is to elucidate how the individual pixels 21-$k$ ($k=1, 2, \ldots$) of the original view of a line 22 are displaced in order to generate the pixels 23-$l$ ($l=1, 2, \ldots$) of a line 24 of a partial view m. The first eight pixels 21-18 to 21-8 have already been displaced in the processing steps S1 to S8 to form the displaced pixels 23-1 to 23-8. For the processing steps S9 to S18, the illustration respectively shows how the individual pixels in the individual steps are displaced or are not displaced and not taken into account. The individual pixels 21-$k$ are illustrated as small boxes, wherein their color defined by the individual color values is identified schematically by means of hatching. The individual control values 23 are assigned to the individual pixels 21-$k$ of the image line 22 of the original view. In method step S9, the pixel 21-9, to which the control value having the magnitude 6 is assigned, is intended to be displaced. The pixels 21-1 to 21-8, to which a control value 0 is assigned in each case have already been displaced. The pixel 21-9 to be displaced is displaced by six pixel locations in the image line 24 of the view to be generated toward the right and thus represents a partial view pixel 25-15. Between that pixel 25-15 of the generated partial view which is defined in method step S9 and that pixel 25-8 of the partial view to be generated which is defined last during the displacement of the original pixel 21-8, blank spaces 25-9 to 25-14 arise. The latter are filled with the color value corresponding to the pixel that was defined just before the currently displaced pixel 25-15, namely the pixel 25-8. This is illustrated schematically in the bracketed image line 24' in the processing step S9'. In the subsequent processing steps S10 and S11, the pixels of the original view 21-10 and 21-11, which are each likewise assigned a control value having the value 6, are displaced into the pixels 25-16 and 25-17, respectively. In the subsequent processing step S12, the pixel 21-12 is assigned a control value having the value 2. If said pixel 21-12 were displaced by two pixel locations, then an already defined pixel, namely the pixel 25-14, would be overwritten. Since pixels which have a lower control value and therefore have a smaller disparity in the displaced views than the previously processed pixels having a control value having the value 6, said pixel 21-12 is literally hidden in the corresponding partial view on account of the disparity. Consequently, said pixel 21-12 is not displaced or not taken into account when defining the color values for the pixels of the partial view to be generated. The same occurs in the subsequent processing steps S13 to S17, in which the pixels 21-13 to 21-17, each assigned a control value 0, would be displaced to an already previously defined pixel of the partial view to be generated. In the processing step S18, however, the pixel 21-18, assigned a control value having the value 0, is used and displaced by 0 pixel locations and thus defines the pixel 25-18 of the line 24 to be generated of the corresponding partial view.

As an alternative to filling the gaps with color values corresponding to the last pixel displaced beforehand, as is illustrated schematically in the method step 9 and 9', the gaps can also be effected by means of an interpolation of the color values, here for example of the pixels 25-8 and 25-15. In the example illustrated, it is assumed that the control values or more precisely the magnitudes of the disparity vectors, which are generated by multiplying the control value by the corresponding displacement vector, are rounded to integral values. In other embodiments, the color values can be interpolated, since the pixels of the original view are then not displaced by exact image locations or pixel distances.

It is noted that the displacement of the pixels with regard to a matrix-like grid directly produces the pixels of the derived partial view only in those cases in which the disparity vectors used during displacement are rounded to integers with regard to their length (if they do not have an integral length anyway) and displacements by whole matrix locations are assigned to the integers. In other cases, the displaced pixels form a pixel structure which need not necessarily have a regular matrix structure even in the event of disregarding the "gaps" possibly present or the pixels that are not to be taken into account during the displacement. This pixel structure then represents as it were an "intermediate matrix", on the basis of which the actual pixel matrix of the partial view is determined. The latter means that the pixels of the pixel matrix of the partial view are determined on the basis of the color values of the pixel structure (intermediate matrix).

Figure 3:
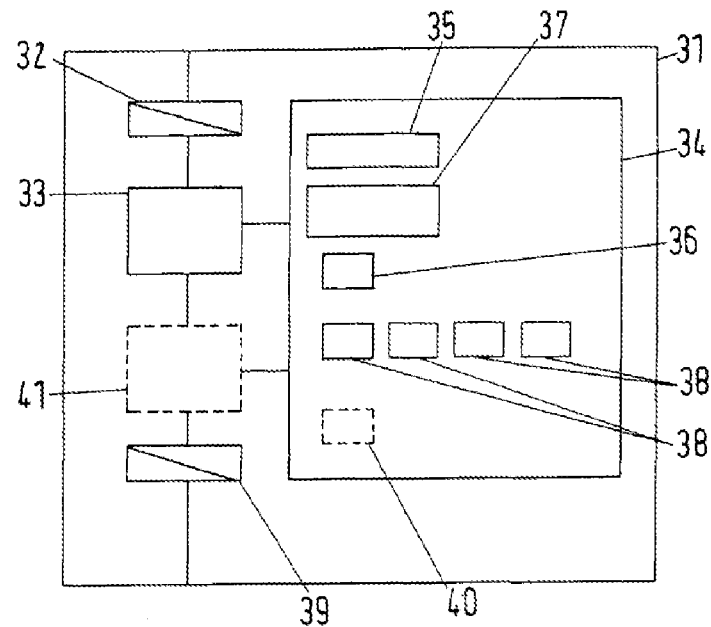
FIG. 3 shows a schematic illustration for a device for conditioning 2D image data for a three-dimensional representation.

FIG. 3 schematically shows a device 31 for image data processing for generating image data for 3D reproduction. Said device is designed to utilize 2D color image data for generating a plurality of partial views therefrom and to combine said partial views as necessary to form a stereoscopic image master. Via an interface 32, the image data of the original view and, if appropriate, parameters about the reproduction device and/or an optimum viewing distance from the reproduction device are received and captured. The interface 32 is coupled from a central processor unit 33, which is in turn linked to a memory 34. The memory 34 comprises a program memory area 35, in which is stored a program code used for controlling the method of operation and functioning of the central processor unit 33. The program memory area 35 can contain both an operating system and application software that controls the actual image data processing. The memory 34 furthermore comprises a first memory area 36, in which the image data received by the interface 32 are stored. If the image data are read in for example in the form of a 24-bit RGB signal, then 24-bit memories are reserved for each pixel. This means that 8 bits in each case are reserved for each of the three primary colors red, green and blue. It is furthermore advantageous to reserve in the first memory area for each pixel an additional number of bits, for example 8 bits, in which an assigned control value can be stored later.

The program code executed on the central processor unit 33 is designed such that the control values can be calculated on the basis of two color values, for example on the basis of the color values for the primary colors red and blue, on the basis of a control value function. In one preferred embodiment, control values are calculated for all possible color value combinations and are stored in a control value memory area 37 of the memory 34. The control value function can additionally also be dependent on parameters which are dependent on the respective reproduction device for which a plurality of partial views of the original view or a stereoscopic image master are/is generated. In addition, as parameter, an optimum viewing distance from the reproduction device can be included as a parameter in the control value function.

However, since these parameters are constant for all views of an image sequence, for example of a video or of a television signal, it is advantageous to calculate the control values once for all possible combinations and to store them in the control value memory area 37 of the memory 34, instead of individually calculating the control values in each case in an up-to-date manner if they are intended to be assigned to individual pixels, as has already been explained above.

The program code is furthermore designed such that in each case at least two color values, preferably the color values of the primary color red and of the primary color blue, are determined for the individual pixels of the original view which are stored in the first memory area 36. In the embodiment described, in which the pixels are transferred in an RGB coding, it is necessary merely to read out in each case the 8-bit memory areas assigned to the two primary colors. On the basis of the values stored therein, which represent the color values for the two primary colors, the corresponding associated control value can then be read out from the control value memory area 37 and be assigned to the corresponding pixel. This value can then be stored for example in the bits of the first memory area 36 that are reserved for this purpose. Alternatively, it is possible, of course, to store instead of the value a pointer that points into the control value memory area 37. In yet alternative embodiments, it is possible to design the control value memory area 37 such that the color values which are already present in the RGB coding and are included in the calculation of the control value are themselves used as pointer values into a matrix-like memory organization of the control value memory area 37. In a subsequent work step, the predetermined displacement vectors are generated for the plurality of partial views to be generated, i.e. the views to be derived, which represent the original scene represented in the original view from different viewing directions.

The image lines of the original view are then processed line by line once for each partial view. Depending on the sign of the displacement vector, the lines of pixels (in this case it is assumed that the pixels are organized in horizontal lines and vertical columns) are processed either from the left toward the right or from the right toward the left. The processing direction is defined in each case by the direction of the associated displacement vector.

As already explained above, a respective disparity vector is formed from the displacement vector and the control value correspondingly assigned to the respective pixel and the pixel is displaced relative to the original view in the generated partial view in accordance with the disparity vector. In this case, in some embodiments provision can be made for rounding the magnitude of the disparity vector to an integral value in each case, such that a displacement by whole grid locations in the matrix-like grid of pixels is effected. A pixel is in each case displaced by whole column units. In other embodiments, the displacement to non-integral positions within the column is permitted and carried out and an interpolation of the color value is subsequently carried out in order to determine the color values at the individual grid locations of the image line.

As already explained above, in the partial view to be generated only those pixels are displaced and taken into account which are displaced, in the processing direction, behind a position (i.e. further) relative to a previously displaced pixel. Otherwise, the corresponding pixel is not taken into account in the partial view. The gaps that occur, to which no pixel is assigned during the displacement, are either filled with the color values of a pixel previously displaced correspondingly to a lesser extent or, if appropriate, by the value zero or are determined on the basis of an interpolation of the color values of the pixels which are arranged adjacent (but not necessarily directly adjacent) to the gaps within the line. The interpolation can be performed linearly or can be performed in the manner following some other predetermined function. Furthermore, it is additionally also possible to take account of color values of displaced pixels which are next but one or next but two, etc. neighbors. Since the individual lines of a partial view and the same lines of different partial views can be calculated independently of one another, it is possible to partly or completely parallelize the image processing. It is thereby possible to achieve an acceleration of the image data processing.

The individual generated partial views of the original scene are stored in second memory areas 38 of the memory 34. If an odd number of partial views are calculated, then generally one of the partial views is identical to the original view. In some embodiments, accordingly, the original view is copied once into a second memory area 38. In some embodiments, the partial views stored in the second memory areas 38 are output via the interface 32 or a further interface 39 for further processing and/or storage. In one preferred embodiment, however, the partial views stored in the second memory areas 38 are combined to form a stereoscopic image master, which is buffer-stored in a stereoscopic image master memory 40. This combination, which is dependent on the reproduction device which is intended to be used, can be performed in a program-controlled manner by means of the central processor device. However, preference is given to embodiments in which a graphics processor 41 calculates the stereoscopic image master on the basis of the partial views stored in the second memory areas 38 and the stereoscopic image master is output via the further interface 39.

The way in which a stereoscopic image master is created from the partial views will be explained briefly below on the basis of an example. The necessary information for being able to perform the combination is generally provided by the manufacturer of the display device that is intended to be used to reproduce the stereoscopic image master. In the example illustrated, it is assumed that the reproduction device 24 can output different items of image information in respectively different viewing direction directions. In the case described here, only four different partial images are used as masters for the three-dimensional reproduction. Since items of information are intended to be output in all viewing directions, the same items of image information are therefore output in a plurality of the spatial directions.

For this exemplary case, the manufacturer of the reproduction device has specified three assignment matrices, which specify in each case one of the three primary colors, red, green, blue of an RGB color system how the corresponding color value of the corresponding primary color for the individual pixels results from the color values of the pixels of the partial views. The three assignment matrices for the primary colors green, blue and red are correspondingly illustrated in FIGS. 6a to 6c. The assignment matrices are in each case 8×12 matrices. The individual matrix entries in each case specify an index assigned to one of the four partial views m. The partial view m=1 is thus assigned the index value 1, for example, in the matrix etc.

It is assumed for the further explanation that the pixels in the partial views and the stereoscopic image master to be generated are in each case indexed by means of an index pair (x, y), where x indicates the position within the line and y indicates the line itself. A pixel of the stereoscopic image master is represented by the expression:

$Pixel^{RBV}[x,y]$

The color value of the primary color "primary color" of the pixel is represented by the expression $Pixel^{RBV}[x,y]$·primary color where, in an RGB color system, "primary color" can assume the values "red", "green" or "blue". The values of the assignment matrices are indexed by means of an index pair (i,j), where i indicates the position within the line and j indicates the line of the assignment matrix itself. The three color values of a pixel of the stereoscopic image master indexed by the index pair (x,y) arrives in a pseudo-computer code notation in accordance with the following instructions:

$pixel^{RBV}[x,y]$·red:=$pixel^{TA(m)}[x,y]$·red with m=assignment matrix red[i,j], where i=x modulo 8 and j=y modulo 12 or when shortened:

$pixel^{RBV}[x,y]$·red:=$pixel^{TA(assignment\ matrix\ RED[x\ modulo\ 8, y\ modulo\ 12])}[x,y]$·red, where $pixel^{TA(m)}[x,y]$·primary color indicates the color value with respect to the primary color "primary color" of the pixel of the partial view m indexed by the index pair (x,y). For the other primary colors, the following correspondingly holds true in the shortened notation:

$Pixel^{RBV}[x,y]$·green:=$pixel^{TA(assignment\ matrix\ GREEN[x\ modulo\ 8, y\ modulo\ 12])}[x,y]$·green $Pixel^{RBV}[x,y]$·blue:=$pixel^{TA(assignment\ matrix\ BLUE[x\ modulo\ 8, y\ modulo\ 12])}[x,y]$·blue The notation "a modulo b" (often also "a mod b") shall be defined here by the following calculation specification:

$$a\ modulo\ b := a - \left\lfloor \frac{a}{b} \right\rfloor \cdot b,$$

where a is a real number and b is a natural number greater than zero and $\lfloor c \rfloor$ stands for the floor function, which specifies for the real number c the largest integer which is less than or equal to the number c, i.e.

$\lfloor c \rfloor := \max(k)$ $k \in Z, k \leq c$

Since the values used for indexing for x and y in the formula indicated above are in each case integers greater than or equal to zero, the calculation specification:

$a\ modulo\ b := a - b \cdot (a\ div\ b)$ could equally well be used, where (a div b) indicates the quotient a/b rounded toward zero.

The application of the formulae indicated above means that, for example, the color values of the pixel at the top on the left, for which x=0 and y=0 hold true, are defined as follows:

From the assignment matrix RED, the value assignment matrix RED[0,0]=1 is derived. This means that the red color value $pixel^{RBV}[0,0]$·red of the pixel $pixel^{RBC}[0,0]$ of the stereoscopic image master is given by the red color value $pixel^{TA1}[0,0]$·red of the pixel $pixel^{TA1}[0,0]$, of the partial view m=1, which is assigned to the index pair (x,y)=(0,0). The green color value is defined by the green color value of the same pixel likewise from the partial view m=1. (Note m[x,y] =assignment matirx$^{PRIMARY\ COLOR[i,j]}$ where i=modulo 8 and j=y modulo 12). For the color value of the primary color blue is defined by the blue color value of the pixel with respect to the index pair (0,0) of the partial view m=2 (m=assignment matrix BLUE[0,0]=2).

Since the assignment matrices are smaller than the partial images or the stereoscopic image master, the matrix entries are used periodically. An assignment matrix having the size of one partial image or of the stereoscopic image master can thus be achieved by stringing together and stacking the respective assignment matrix. Mathematically, this can be described by the modulo functions indicated. For indices x>7 and/or y>11, what is achieved by the corresponding specifications i=x modulo 8 and j=y modulo 12 is that the corresponding partial image index of this virtually enlarged matrix can be read directly from the given assignment matrix.

Figure 4:
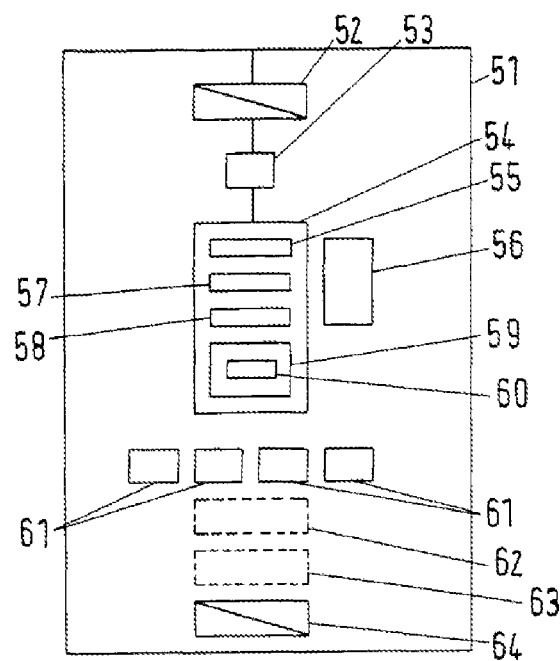
FIG. 4 shows a further embodiment of a schematic illustration of a device for conditioning 2D image data for a three-dimensional representation.

FIG. 4 schematically illustrates a further embodiment of a device 51 for image data processing. In this embodiment, the individual functional units are formed partly or completely in hardware, for example by means of an FPGA or an application-specific processor chip (ASIC). Via an interface 52, once again the image data of the original view and, if appropriate, further parameters are received and stored in the first memory area 53. Partial views are subsequently generated by means of a view determining unit 54. With the aid of a calculation unit 55, the control values are calculated and stored in the control value memory area 56. A color value determining unit 57 determines two color values of two primary colors of a color system for each of the pixels. For this purpose, it may be necessary to convert the color information of a pixel from one color system into another color system. On the basis of the color values determined, an assignment unit 58 assigns a control value of the control value memory area 56 to the respective pixel. The assigned control value can, for example, likewise be stored in the first memory area 53. A partial view determining unit 59 subsequently determines, as already explained above, on the basis of the image data stored in the first memory area and the assigned control values, a plurality of partial views which are stored in second memory areas 61. In this case, a displacement of the pixels with the original view is performed in a displacement unit 60, as has been explained by way of example in association with FIG. 2. A combination unit 62 combines, if appropriate, the plurality of partial views to form a stereoscopic image master, which, if appropriate, is stored in a stereoscopic image master memory 63 and then output via a further interface 64. In other embodiments, the buffer-storage of the stereoscopic image master and, if appropriate, the creation of the stereoscopic image master can be omitted. In the latter case, the partial views are then output and provided directly via the further interface.

Figure 5:
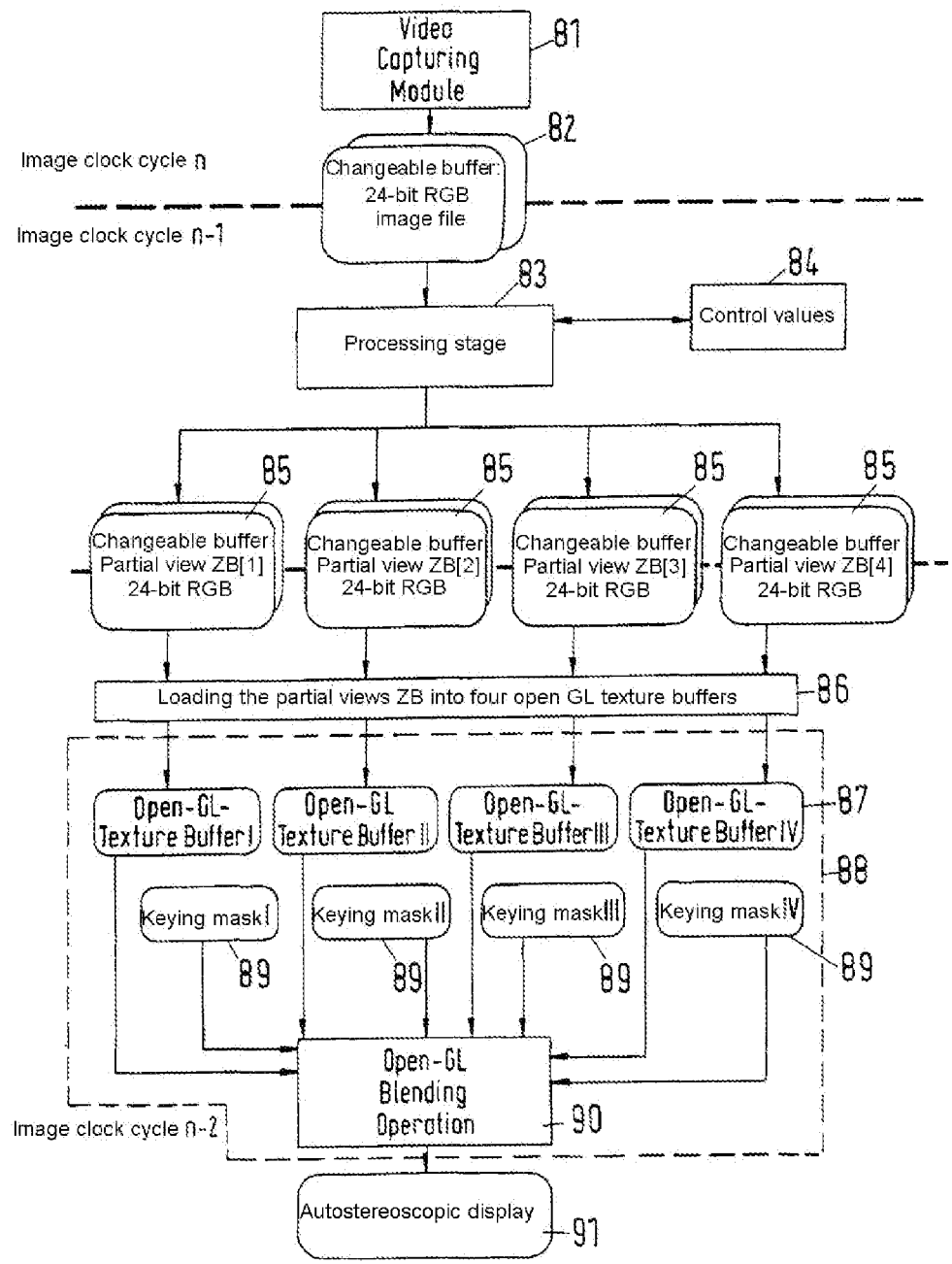
FIG. 5 shows a schematic illustration for clarifying optimized processing of 2D image data for three-dimensional representation.

Depending on how the hardware is designed, it may be advantageous to distribute the calculation of the stereoscopic image master during processing of a sequence of views among a plurality of cycles of said sequence. This is illustrated by way of example in FIG. 5. In a first image clock cycle, the image data are captured by a capturing module 81 and written to a changeable memory buffer 82. The latter corresponds to the first memory carrier. In the subsequent image clock cycle, the image data are read out from the changeable memory buffer 82 and processed by means of a processing unit as indicated above, by virtue of the fact that the pixels are assigned control values from a control value memory 84 and the corresponding displacements of the pixels are subsequently determined therefrom together with the displacement vectors and are performed and the partial views are thus generated, which are stored in further changeable memory buffers 85. In another subsequent image clock cycle, the partial views stored in the further changeable memory buffers 85 are then read in as so-called texture buffers 87 of a graphics processing unit 88. Keying masks 89 are assigned to the individual texture buffers 87. By means of an AND operation between the respective keying mask 89 at the texture buffer 87, the color values of individual pixels for creating the stereoscopic image master are selected and combined by means of OR combinations in a so-called blending unit 90 to form a stereoscopic image master, which is output by an autostereoscopic reproduction device 91 in a subsequent image clock cycle.

The use of the various memories or memory areas can be restricted, in particular, in the case of embodiments implemented in hardware, Thus, the calculated partial views or the pixels thereof can be output, for example, without buffer-storage. Even if a stereoscopic image master is intended to be calculated, it is not necessary to buffer-store all the partial views. It suffices to buffer-store only parts, for example parts of the same line of the partial views, in order to determine the individual pixels of the stereoscopic image master. In optimized circuits, a memory requirement can be greatly reduced.

Figure 7:
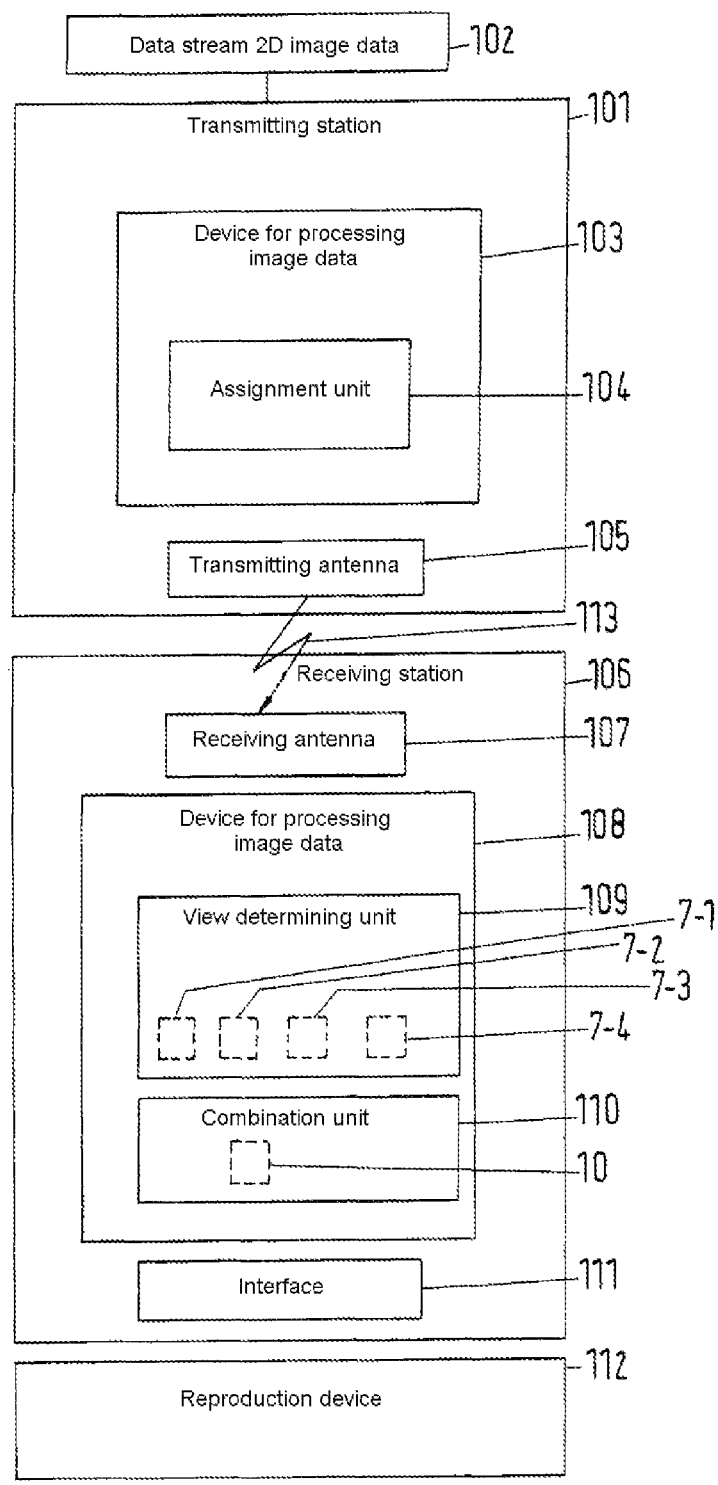
FIG. 7 shows a schematic illustration of a method in which control values are assigned to the 2D image data in a transmitting station and, at receiving stations, from the received 2D image data of the original view together with the received control data, the partial views are derived and combined to form stereoscopic image masters.

FIG. 7 schematically shows an embodiment in which the control value assignment to the pixels and the "actual" determination of the partial views take place spatially separately. A 2D image data stream 102 is provided for a transmitting station 101. The 2D image data stream 102 comprises, for example, successive original views of a film sequence or of a film. The transmitting station 101 comprises a device 103 for image data processing, which assigns disparity information in the form of control values in each case to the individual pixels of the 2D image data, as explained thoroughly above. The device comprises an assignment unit 104 for this purpose. Said assignment unit can comprise, for example, a color value determining unit, a calculation unit and, if appropriate, a control value memory, which are not illustrated separately. Via an interface, embodied as a transmitting antenna 105, for example, the 2D image data together with the control values assigned to the pixels are transmitted to one or more receiving stations 106, only one of which is illustrated here.

The receiving station 106 comprises an interface embodied as a receiving antenna 107, for example. The 2D image data are forwarded together with the control values assigned to the pixels to a device 108 for image processing for generating image data for reproduction in the case of which a three-dimensional impression arises in an observer. Said device 108 is designed to generate the partial views 7-1 to 7-4 and, if appropriate, also a stereoscopic image master 10, as has been described precisely above. It goes without saying that it is no longer necessary to determine the control values, since the latter, after all, have already been transmitted with the 2D image data. The device 108 thus comprises a view determining unit 109, which determines partial views 7-1 to 7-4. Preferably, a stereoscopic image master 10 is created from the partial views 7-1 to 7-4 in a combination unit 110, said stereoscopic image master being output via an output interface 111 to an autostereoscopic reproduction device 112 and reproduced by the latter.

It is self-evident to the person skilled in the art that only exemplary embodiments have been described here. In particular, the process of combining the individual partial views to form a stereoscopic image master has been described merely by way of example here. In its precise configuration this process is dependent on the respective stereoscopic reproduction device that is intended to be used for reproduction.

| List of Reference Symbols | |
| --- | --- |
| 1 | Method |
| 2 | 2D image data |

-continued

| List of Reference Symbols | |
|---|---|
| 3 | Data carrier |
| 4 | Image sequence |
| 5 | Receiving/reproduction device |
| 6 | View determining unit |
| 7-m | Partial view m (m = 1, ..., m) |
| 8 | Control values |
| 9 | Reproduction device |
| 10 | Stereoscopic image master |
| 11 | Recombination stage |
| 21, 21-k | Pixel, pixel k (k = 1, 2, ...) |
| 22 | Line (of the original view) |
| 23, 23-k | Control value, control value of the pixel k (k = 1, 2, ...) |
| 24 | Line (of the displaced pixels) |
| 24, 25-1 | Displaced pixel, displaced pixel 1 (1 = 1, 2, ...) |
| Si | Method step i |
| 31 | Device for image data processing |
| 32 | Interface |
| 33 | Processor unit |
| 34 | Memory |
| 35 | Program memory area |
| 36 | First memory area |
| 37 | Control value memory area |
| 38 | Second memory areas |
| 39 | Further interface |
| 40 | Stereoscopic image master memory |
| 41 | Graphic processor |
| 51 | Device for image data processing |
| 52 | Interface |
| 53 | First memory area |
| 54 | View determining unit |
| 55 | Calculation unit |
| 56 | Control value memory area |
| 57 | Color value determining unit |
| 58 | Assignment unit |
| 59 | Partial view determining unit |
| 60 | Displacement unit |
| 61 | Second memory areas |
| 62 | Combination unit |
| 63 | Stereoscopic image master memory |
| 64 | Further interface |
| 81 | Capturing module |
| 82 | Changeable memory buffer |
| 83 | Control value memory |
| 84 | Changeable memory buffers |
| 87 | Texture buffer |
| 88 | Graphics processing unit |
| 89 | Keying mask |
| 90 | Blending unit |
| 91 | Reproduction device |
| 101 | Transmitting station |
| 102 | 2D image data stream |
| 103 | Device for image data processing |
| 104 | Assignment unit |
| 105 | Transmitting antenna |
| 106 | Receiving station |
| 107 | Receiving antenna |
| 108 | Device for image processing for generating image data which evoke a three-dimensional impression upon reproduction |
| 109 | View determining unit |
| 110 | Combination unit |
| 111 | Output interface |
| 112 | Reproduction device |
| 113 | Arrow |

The invention claimed is:

1. A method for generating image data for reproduction that evokes a three-dimensional visual impression in a human observer, the method comprising the following steps:
   receiving and/or reading in 2D image data of an original view,
   for each pixel of the 2D image data of the original view, determining color values of at least two primary colors of a color system;
   assigning a control value to each of the pixels in an automated manner depending on the at least two color values thus determined, with each of the control values representing disparity information; and
   deriving a plurality of further partial views representing information shown in the original view from different viewing angles, by displacing the individual pixels of the original view relative to one another pixel by pixel in accordance with a displacement vector predetermined for the respective view and in accordance with the control value assigned to the individual pixel, and deriving the pixels of the respective partial view on a basis of the displaced pixels.

2. The method according to claim 1, which comprises calculating the control values on the basis of a control value function dependent on the at least two color values determined as variables.

3. The method according to claim 1, which comprises assigning the pixels of the original view to a matrix having vertical columns and horizontal lines, and wherein the displacement vectors are collinear with the lines such that the individual pixels are displaced within their line in the course of being displaced relative to one another.

4. The method according to claim 1, wherein the control value function is additionally dependent on parameters defined by at least one of a configuration of the stereoscopic reproduction device or an optimum viewing distance from the stereoscopic reproduction device.

5. The method according to claim 1, which comprises calculating and storing in a memory the control values for all possible color value combinations of the at least two color values and, in the course of the control values being assigned to the pixels, reading the control values out from the memory in each case depending on the at least two color values determined.

6. The method according to claim 1, which comprises calculating the control values in each case individually in an up-to-date manner for each of the pixels on the basis of the control value function.

7. The method according to claim 1, wherein the plurality of partial views determined are n views, where n is a natural number, n≥2, and the displacement vector $V_m$ of a view m, where m=1, ..., n is given by $V_m = a*(-1+2*(m-1)/(n-1))$ and a is a constant, with preference given to a=1.

8. The method according to claim 1, wherein the control value for a pixel with the color values $f_1$ and $f_2$ for two primary colors is calculated in accordance with the following formula:

$$S(f_1, f_2) = (|f_1 - f_1^{lim}|/\text{const.}) \text{ for } |f_1 - f_1^{lim}| >= |f_2 - f_2^{lim}|,$$

otherwise $S(f_1, f_2) = (|f_2 - f_2^{lim}|/\text{const.})$;
where const. denotes a normalization constant and $f_1^{lim}$ and $f_2^{lim}$ are color limit values of the primary colors, at which the control value function $S(f_1, f_2)$ has an extreme value.

9. The method according to claim 1, which comprises displacing the pixels in each case in accordance with a disparity vector formed from a product of the displacement vector assigned to the corresponding partial view and the control value assigned to the pixel, wherein lengths of the disparity vectors are rounded (up and/or down) to integral values.

10. The method according to claim 1, wherein the individual pixels of the original view, during the generation of one of the plurality of partial views are displaced in each case in accordance with a disparity vector determined for the respective pixel, wherein the disparity vector for each pixel is calculated from a product of the control value assigned to the pixel and the displacement vector $V_m$ of the corresponding partial view, wherein a pixel of the partial view is defined on the basis of the color values of the pixel to which the higher control value is assigned, if two pixels of the original view are displaced to the same position or the same displaced pixel.

11. The method according to claim 1, wherein a matrix-like pixel array of the partial view is filled on the basis of the displaced pixels, wherein the color values of array locations are defined, if appropriate, by color values of a displaced pixel whose position in the line along the direction of the displacement vector lies before the position of the pixel to be defined of the respective partial view, or/and the color values are calculated by an interpolation from the color values of the displaced pixels adjacent to the position of the pixel to be defined.

12. The method according to claim 1, which comprises converting a pixel resolution of the original view to a pixel resolution of the plurality of partial views to be generated, prior to assigning the control values to the pixels.

13. An image processing device for generating image data to be reproduced by a reproduction device, wherein the reproduction of the image data by the reproduction device evokes a three-dimensional visual impression in a human observer, the device comprising:
    an interface for receiving digital 2D image data of an original view represented by pixels; and
    a view determining unit for deriving a plurality of further derived partial views representing an original scene represented in the original view from different viewing angles, said view determining unit including:
        a color value determining unit configured for determining color values for at least two primary colors of a color system for each of the pixels of the original view;
        an assignment unit configured to assign a control value to each of the pixels, depending on the at least two color values determined by said color value determining unit; and
        a displacement unit configured to displace, for each of the further partial views, each of the individual pixels of the original view depending on an assigned control value and a displacement vector predetermined for the corresponding partial view, and to derive the pixels of the respective partial view on a basis of the displaced pixels.

14. The device according to claim 13, which further comprises a calculation unit for calculating the control values on the basis of a control value function dependent on the at least two color values determined as variables.

15. The device according to claim 14, wherein said calculation unit is linked to a control value memory and the control values for all color value combinations are calculated and stored in said control value memory, such that said assignment unit can read out the control values from said control value memory.

16. The device according to claim 14, wherein said assignment unit is configured to calculate the control values in each case individually in an up-to-date manner for each of the pixels on the basis of the control value function.

17. The device according to claim 14, wherein the control value function is additionally dependent on parameters that are defined by at least one of a configuration of the stereoscopic reproduction device or an optimum viewing distance from the stereoscopic reproduction device.

18. The device according to claim 13, wherein the plurality of partial views are n views, where n is a natural number equal or greater than 2 (n≥2) and a displacement vector $V_m$ of the partial view m where $m=1, \ldots, n$ is given by $V_m = a*(-1+2*(m-1)/(n-1))$ and a is a constant, with a preference given to $a=1$.

19. The device according to claim 13, wherein the control value for a pixel with the color values $f_1$ and $f_2$ is calculated in accordance with the following formula:

$$S(f_1,f_2)=(|f_1-f_1^{lim}|/\text{const.}), \text{ if } |f_1-f_1^{lim}|>=|f_2-f_2^{lim}|;$$

otherwise $S(f_1,f_2)=(|f_2-f_2^{lim}|/\text{const.})$,
    where const. denotes a normalization constant and $f_1^{lim}$ and $f_2^{lim}$ are color limit values of the primary colors, at which the control value function $S(f_1,f_2)$ has an extreme value.

20. The device according to claim 13, wherein said displacement unit is configured to displace the individual pixels in accordance with disparity vectors which are formed in each case from a product of the displacement vector assigned to the corresponding partial view and the control value assigned to the pixel, wherein said displacement unit is configured to round (up or down) lengths of disparity vectors to integral values.

21. The device according to claim 13, wherein the individual pixels of the original view, during the generation of one of the plurality of partial views are displaced in each case in accordance with a disparity vector determined for the respective pixel, wherein the disparity vector for each pixel is calculated from a product of the control value assigned to the pixel and the displacement vector of the corresponding partial view, wherein the pixels of the original view are successively processed line by line individually in the direction in which the respective displacement vector points which is assigned to the partial view generated, and pixels which are displaced to a position which remains behind a position or is identical to a position to which a pixel of the line has already been displaced beforehand are not taken into consideration.

22. The device according to claim 13, wherein in the course of deriving the pixels of the further partial views, the pixels displaced for the corresponding partial view are in each case taken into consideration.

23. The device according to claim 13, wherein a pixel of the partial view m is defined on the basis of the color values of the pixel to which the higher control value is assigned, if two pixels of the original view are displaced to the same position or the same displaced pixel.

24. The device according to claim 13, wherein a matrix-like pixel array of the partial view m is filled on the basis of the displaced pixels, wherein the color values of array locations are defined, if appropriate, by color values of adjacent displaced pixels, or/and the color values are calculated by an interpolation from the color values of the adjacent displaced pixels of the array location.

25. The device according to claim 13, wherein a pixel resolution of the original view is converted to a pixel resolution of the plurality of partial views to be generated, before control values are assigned to the pixels.

26. The device according to claim 13, which comprises second memory areas configured to store therein the partial views, and a combination unit connected to said second memory areas and configured to create a stereoscopic image master from the plurality of partial views.

27. A method of generating image data for a reproduction that evokes a three-dimensional visual impression in a human observer, the method comprising the following steps:
    receiving and/or reading in 2D image data of an original view and control values assigned to pixels of the 2D image data, wherein each of the control values represents disparity information and, for the assigned pixel of the 2D image data of the original view, is determined from color values of at least two primary colors of a color system or can be determined from them in an automated manner, deriving a plurality of further partial views which represent the information shown in the original view from different viewing angles;

wherein when deriving the plurality of partial views which represent different viewing directions of an original scene represented by the 2D image data of the original view, the individual pixels of the original view are displaced relative to one another pixel by pixel in accordance with a displacement vector predetermined for the respective view and in accordance with the control value assigned to the individual pixel, and the pixels of the respective partial view are derived on the basis of the displaced pixels.

28. The method according to claim 27, which comprises assigning the pixels of the original view to a matrix having vertical columns and horizontal lines, and wherein the displacement vectors are collinear with the lines, such that the individual pixels are displaced within their line in the course of being displaced relative to one another.

29. The method according to claim 27, wherein the plurality of partial views determined are n views, where n is a natural number equal or greater 2 and the displacement vector $V_m$ of a view m, where m=1, ..., n, is given by $V_m=a*(-1+2*(m-1)/(n-1))$ and a is a constant, with preference given to a=1.

30. The method according to claim 27, which comprises displacing the pixels in each case in accordance with a disparity vector formed from a product of the displacement vector assigned to the corresponding partial view and the control value assigned to the pixel, and wherein lengths of the disparity vectors are rounded (up and/or down) to integral values.

31. The method according to claim 27, wherein the individual pixels of the original view, during the generation of one of the plurality of partial views are displaced in each case in accordance with a disparity vector determined for the respective pixel, wherein the disparity vector for each pixel is calculated from a product of the control value assigned to the pixel and the displacement vector $V_m$ of the corresponding partial view, wherein a pixel of the partial view is defined on the basis of the color values of the pixel to which the higher control value is assigned, if two pixels of the original view are displaced to the same position or the same displaced pixel.

32. The method according to claim 27, wherein a matrix-like pixel array of the partial view is filled on the basis of the displaced pixels, wherein the color values of array locations are defined, if appropriate, by color values of a displaced pixel whose position in the line along the direction of the displacement vector lies before the position of the pixel to be defined of the respective partial view, or/and the color values are calculated by an interpolation from the color values of the displaced pixels adjacent to the position of the pixel to be defined.

33. An image data processing device for generating image data for reproduction by way of a reproduction device, wherein the reproduction on the reproduction device evokes a three-dimensional visual impression in a human observer, the image data processing device comprising:

an interface for receiving digital 2D image data of an original view and control values, wherein each pixel is assigned exactly one control value and each of the control values represents disparity information and, for the assigned pixel of the 2D image data of the original view, is determined from color values of at least two primary colors of a color system of the assigned pixel or can be determined from said color values in an automated manner;

a view determining unit for deriving a plurality of partial views which represent the original scene represented in the original view from different viewing angles; and a combination unit for creating a stereoscopic image master from the plurality of partial views, said determining unit including a displacement unit configured to displace, for each of the partial views, each of the individual pixels of the original view depending on the assigned control value and a displacement vector predetermined for the corresponding partial view and to derive the pixels of the respective partial view on the basis of the displaced pixels.

34. The device according to claim 33, wherein the plurality of partial views determined are n views, where n is a natural number equal or greater 2 and the displacement vector $V_m$ of the partial view m where m=1, ..., m is given by $V_m=a*(-1+2*(m-1)/(n-1))$ and a is a constant, with preference being afforded to a=1.

35. The device according to claim 33, wherein said displacement unit is configured to displace the individual pixels in accordance with disparity vectors which are formed in each case from a product of the displacement vector assigned to the corresponding partial view and the control value assigned to the pixel, and wherein said displacement unit is configured to round the lengths of the disparity vectors to integral values.

36. The device according to claim 33, wherein the individual pixels of the original view, during the generation of one of the plurality of partial views are displaced in each case in accordance with a disparity vector determined for the respective pixel, wherein the disparity vector for each pixel is calculated from a product of the control value assigned to the pixel and the displacement vector of the corresponding partial view, wherein the pixels of the original view are successively processed line by line individually in the direction in which the respective displacement vector points which is assigned to the partial view generated, and pixels which are displaced to a position which remains behind a position or is identical to a position to which a pixel of the line has already been displaced beforehand are not taken into consideration.

37. The device according to claim 33, wherein in the course of deriving the pixels of the further partial views, the pixels displaced for the corresponding partial view are in each case taken into consideration.

38. The device according to claim 33, wherein a pixel of the partial view m is defined on the basis of the color values of the pixel to which the higher control value is assigned, if two pixels of the original view are displaced to the same position or the same displaced pixel.

39. The device according to claim 33, wherein a matrix-like pixel array of the partial view m is filled on the basis of the displaced pixels, wherein the color values of array locations are defined, if appropriate, by color values of adjacent displaced pixels, or/and the color values are calculated by an interpolation from the color values of the adjacent displaced pixels of the array location.

40. The device according to claim 33, wherein a pixel resolution of the original view is converted to a pixel resolution of the plurality of partial views to be generated, before the partial views are generated.

41. The device according to claim 33, which further comprises second memory areas configured to store the partial views, and wherein said combination unit is connected to said second memory areas and configured to create a stereoscopic image master from the plurality of partial views.

* * * * *